May 22, 1962 C. A. WOODCOCK 3,036,208
HEADLAMP ASSEMBLY
Filed Jan. 8, 1959 2 Sheets-Sheet 1
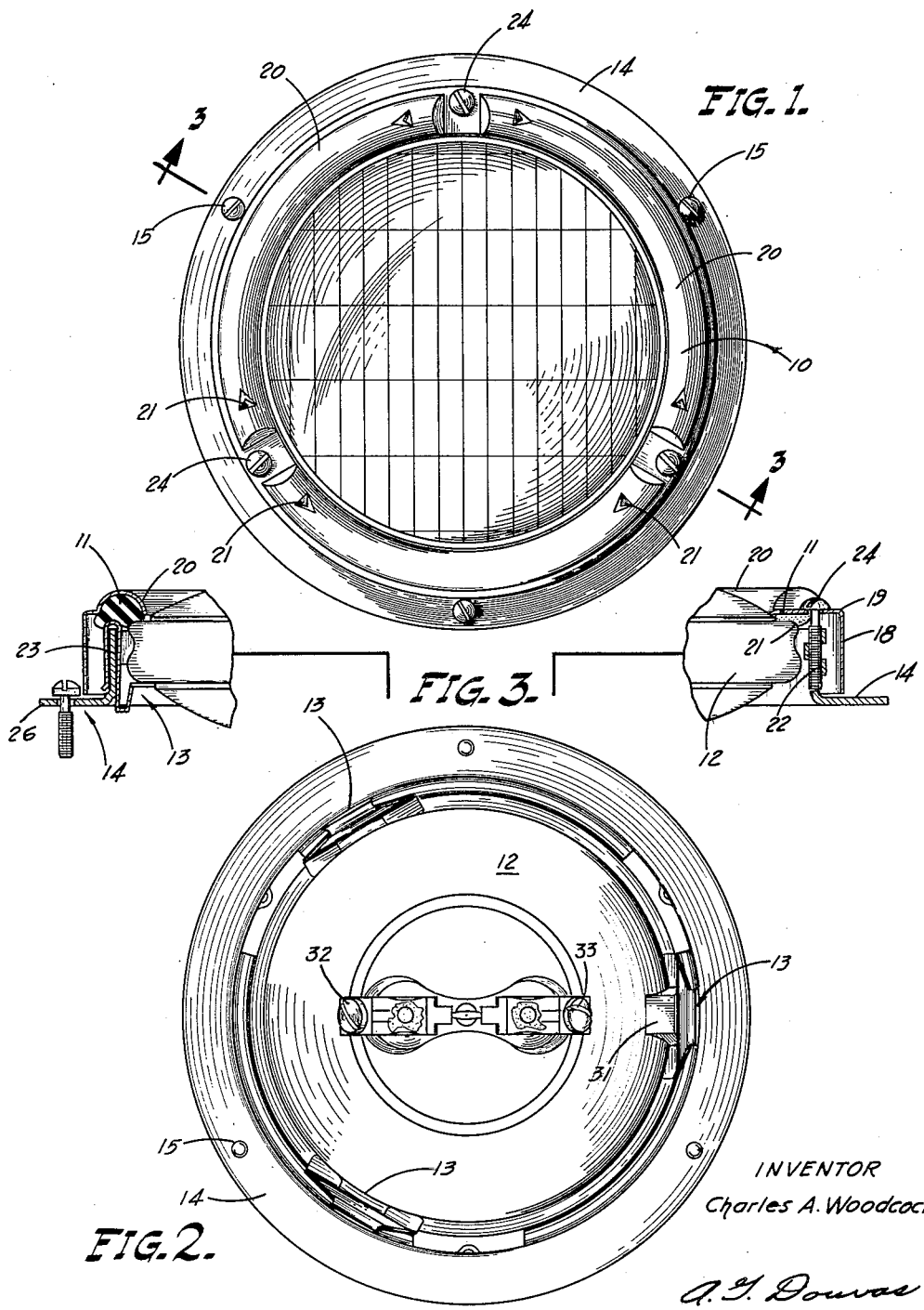
INVENTOR
Charles A. Woodcock
BY
ATTORNEY

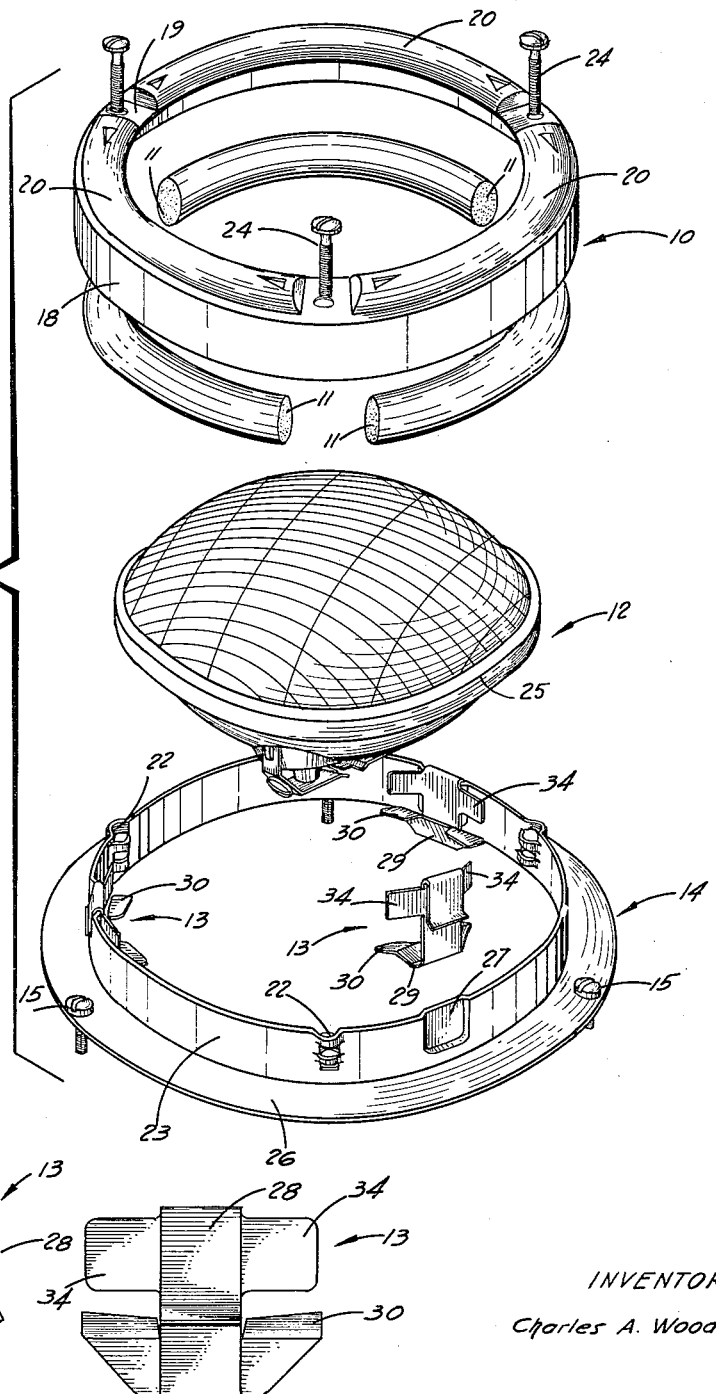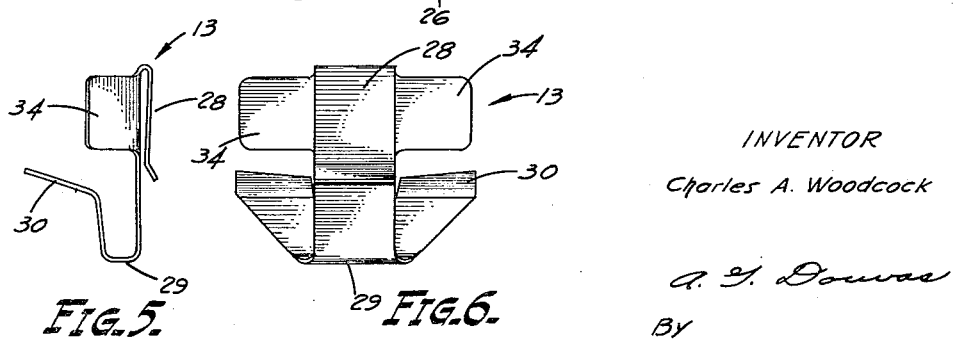

3,036,208
           HEADLAMP ASSEMBLY
Charles A. Woodcock, Springfield, Ill., assignor to
  Stewart-Warner Corporation, Chicago, Ill., a corporation of Virginia
           Filed Jan. 8, 1959, Ser. No. 785,726
               6 Claims. (Cl. 240—90)

This invention relates to a headlamp assembly, and more particularly to a headlamp for a tractor and mounting means therefor supporting the headlamp resiliently at all points of support.

An object of the invention is to provide a headlamp assembly in which the periphery and front and back rim portions of a headlamp all are resiliently supported.

Another object of the invention is to provide a plurality of spring clips for supporting the periphery and back rim portion of a headlamp resiliently on a supporting frame. One of the clips may have a keyway therein for receiving a projection on the headlamp to orient the lamp relative to the frame.

Another object of the invention is to provide a simple, rugged device for supporting a headlamp assembly resiliently.

Another object of the invention is to provide for a headlamp assembly a bezel which has stop portions pressed to positions in which they are adapted to penetrate an elastomer cushion to secure the cushion to the bezel.

Another object of the invention is to provide a headlamp mounting clip having a spring clip portion designed to be placed over the flange of a mounting frame and having a resilient portion to bear against the periphery of the headlamp and a second resilient portion serving as a seat for the back of the rim portion of the headlamp. The second resilient portion may be bifurcated to receive a projection of the headlamp to key the headlamp thereto.

In one preferred embodiment of the invention there may be provided a bezel secured to a mounting frame and pressing an elastomer cushion against the front rim portion of a headlamp to seat the headlamp against seat portions of spring clips and press the clips firmly on the mounting frame. One of the clips may be keyed to the frame and provided with a keyway for receiving a projection on the headlamp to orient the headlamp relative to the frame. The bezel may be provided with sharp anchor tabs for impaling the resilient cushion to hold the cushion to the bezel.

A complete understanding of the invention may be obtained from the following description when read with the accompanying drawings, in which:

FIG. 1 is a front elevational view of a headlamp assembly embodying the invention;

FIG. 2 is a rear elevational view of the headlamp assembly of FIG. 1;

FIG. 3 is a sectional view taken along line 3—3 of FIG. 1;

FIG. 4 is an exploded perspective view of the headlamp assembly of FIG. 1;

FIG. 5 is a side elevational view of a mounting clip of the headlamp assembly of FIG. 1; and FIG. 6 is a rear elevational view of the clip of FIG. 5.

Referring in more detail to the drawings, the headlamp assembly shown therein includes a bezel 10 (FIGS. 1 and 3), which presses three rod-like cushions 11 against a headlamp 12 to urge the headlamp against spring brackets or clips 13. The clips 13 are supported by a mounting frame 14 and are keyed thereto. The frame 14 may be secured by screws 15 to a vertical wall (not shown) of a tractor or the like.

The bezel 10 is drawn from sheet metal and has a cylindrical body 18 and an annular flange 19 from which three groove-forming portions 20 are pushed out to provide recessed seats for the cushions 11. Sharp spades or tabs 21 are punched out of the portions 20 and stick into the ends of the cushions to hold the cushions in the portions 20 even when the bezel is removed from the assembly. To secure the bezel to the frame 14, the frame has split, tapped bores 22 (FIGS. 3 and 4) in a sleeve 23 thereof for receiving screws 24. The screws 24 draw the bezel down to press the cushions into resilient, sealed relationship with the front face or shoulder of and against the periphery of a rim 25 of the headlamp 12. The cushions also are pressed into resilient, sealed relationship with the end of the sleeve 23 as best shown in FIG. 3, and press the clips 13 tightly on the sleeve 23. The frame 14 also has a mounting rim 26 through which the screws 15 project, and the sleeve 23 is provided with cupped seat portions 27 (FIG. 4) for receiving folded over spring clip portions 28 of the brackets 13.

The clip portions 28 resiliently grip the seat portions 27 to retain the brackets 13 on the frame 14 except when the brackets are deliberately removed. The brackets are formed of leaf spring metal and have U-shaped spring portions 29 from which bifurcated seats 30 project. The bifurcated seats provide a keying slot for a keying projection or lug 31 (FIG. 2) on the headlamp 12 to precisely orient the headlamp relative to the frame 14, the walls of the seat portions 27 (FIG. 4) preventing sliding movement of the brackets peripherally along the sleeve 23. The brackets 13 also have spring arms 34 projecting inwardly from the sleeve 23 to resiliently engage the periphery of the rim of the headlamp and keep the rim spaced from the sleeve 23 at all times. Terminals 32 and 33 (FIG. 2) lead to filaments (not shown) in the headlamp.

In the headlamp assembly described above, the spring clips or brackets 13 define a resilient socket to resiliently or floatingly support the back face of the rim 25 of the headlamp, key the headlamp, and also floatingly support the periphery of the rim 25. The only other elements engaging the headlamp are the cushions 11 which sealingly and resiliently engage the headlamp. Hence, the headlamp is resiliently supported to isolate it from shocks which the frame 14 may receive from the tractor or other vehicle on which the frame is mounted. Since the cushions 11 are secured in the grooved seat portions 20 by the sharp spades or tabs 21, the cushions are retained in the portions 20 even when the bezel 10 is removed from the frame 14. Also, the clips 13 hold the headlamp in the frame 14 even when the bezel is removed from the frame. The lower ends of the screws 15 and 24 are threaded and must be threaded through the bores in the rim of the bezel and base of the frame. Hence, the screws are prevented from falling out of the bores when the frame and bezel are in disassembled relationship and the frame is removed from the supporting structure of the tractor. Thus, there is no danger of losing parts when the assembly is disassembled.

It should be understood that the above described examples are merely illustrative of the principles of this invention, and that numerous modifications may be devised by those skilled in the art without departing from the scope of the invention.

What is claimed is:

1. In a headlamp assembly, the combination of a mounting frame having an annular base and also having a sleeve projecting from the base, the sleeve having tapped bores and also being provided with inwardly pressed seat portions, a plurality of resilient brackets having clips positioned over the seat portions and also having spring arms projecting inwardly from the sleeve, the brackets also having bifurcated seats, a headlamp having an annular rim positioned with the periphery of the rim in engagement with the arms of the brackets and one face of the rim in engagement with the bifurcated seats of the brackets, the headlamp also having a projection fitting in keyed relationship between the bifurcated arms of one of the brackets, a bezel secured to the frame, and cushion means between the bezel and the other face of the headlamp to urge the headlamp against the seats of the brackets.

2. The combination of claim 1 in which the bezel has an arcuately grooved flange for seating the cushion means.

3. The combination of claim 1 in which the bezel has a plurality of sharp spades projecting into the cushion means to secure the cushion means to the bezel.

4. The combination defined by claim 1 in which the bezel has a plurality of arcuately extending grooved seats terminating in sharp tabs, and the cushion means comprises a plurality of rod-like cushion members seated in the grooved seats with the ends thereof engaged by the sharp tabs.

5. A resilient support arrangement for a headlamp having an annular rim, comprising a frame having an opening therein for receiving the headlamp, said opening being larger than the rim so that the rim is spaced from the periphery thereof when the headlamp is centered therein, a plurality of spaced brackets coupled to the frame, each of the brackets having a resilient seat portion projecting inwardly of the opening adapted to engage the headlamp therein on the rearward side of the rim, a bezel secured to the frame on the forward side of the rim, and a resilient cushion interposed between the forward side of the rim and bezel and operable to bias the headlamp against each resilient seat portion to support the headlamp resiliently relative to the frame.

6. A resilient support arrangement for a headlamp having an annular rim, comprising a frame having an opening therein for receiving the headlamp, said opening being larger than the rim so that the rim is spaced from the periphery thereof when centered therein, a plurality of spaced brackets coupled to the frame, each of the brackets having a pair of diverging resilient arms projecting transversely of the opening and adapted to engage the rim of the headlamp therein for maintaining the headlamp spaced from the frame, each of the brackets also having a resilient seat portion extending transversely of the resilient arms and inwardly of the opening and adapted to engage the headlamp therein on the rearward side of the rim, a bezel secured to the frame on the forward side of the rim, and a resilient cushion interposed between the forward side of the rim and bezel and operable to bias the headlamp against each resilient seat portion, so that the headlamp is supported resiliently relative to the frame.

References Cited in the file of this patent
UNITED STATES PATENTS

| | | |
|---|---|---|
| 2,112,323 | Alden | Mar. 29, 1938 |
| 2,571,375 | Morgenstein | Oct. 16, 1951 |
| 2,733,336 | Clayton | Jan. 31, 1956 |
| 2,762,908 | Gaither | Sept. 11, 1956 |